(12) United States Patent
Kudou et al.

(10) Patent No.: US 7,418,178 B2
(45) Date of Patent: Aug. 26, 2008

(54) MULTI-CORE FIBER

(75) Inventors: Manabu Kudou, Sakura (JP); Kazuhiko Aikawa, Sakura (JP); Takashi Tsumanuma, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/935,113

(22) Filed: Nov. 5, 2007

(65) Prior Publication Data

US 2008/0107386 A1  May 8, 2008

(30) Foreign Application Priority Data

Nov. 6, 2006  (JP) .............................. 2006-300505

(51) Int. Cl.
*G02B 6/02* (2006.01)

(52) U.S. Cl. ........................ 385/126; 385/115; 385/116; 385/117

(58) Field of Classification Search ........................ None
See application file for complete search history.

(56) References Cited

U.S. PATENT DOCUMENTS 5,087,108 A * 2/1992 Grasso et al. .................. 385/27
6,154,594 A * 11/2000 Fiacco et al. ................. 385/126

FOREIGN PATENT DOCUMENTS

| EP | 0 125 828 A1 | 11/1984 |
| EP | 0 391 742 A2 | 10/1990 |
| JP | 62-249111 A | 10/1987 |
| JP | 8-15535 A | 1/1996 |
| JP | 08-224240 A | 9/1996 |
| JP | 8-240728 A | 9/1996 |
| JP | 2005-512746 A | 5/2005 |
| JP | 2005-512747 A | 5/2005 |
| JP | 2005-515434 A | 5/2005 |
| JP | 2005-532883 A | 11/2005 |
| JP | 2005-532884 A | 11/2005 |
| JP | 2006-58740 A | 3/2006 |
| JP | 2006-511309 A | 4/2006 |
| JP | 2006-515075 A | 5/2006 |

OTHER PUBLICATIONS

In Vivo Imaging of the Bronchial Wall Microstructure Using Fibered Confocal Fluorescence Microscopy Oct. 5, 2006.

* cited by examiner

*Primary Examiner*—Sung Pak
*Assistant Examiner*—Chad H Smith
(74) *Attorney, Agent, or Firm*—Sughrue Mion, PLLC

(57) ABSTRACT

A multi-core optical fiber apparatus is disclosed. The multi-core optical fiber apparatus includes a cladding comprising quartz and a plurality of cores embedded in the cladding. Each of the cores has a diameter (D) ranging from 1.3 μm to 2.0 μm, a numerical aperture (NA) from 0.35 to 0.45 and a refractive index profile factor ($\alpha$) from 2.0 to 4.0. A center of each of the cores has a germanium content of 20 wt % to 30 wt %. An interval between adjacent cores is 3.0 μm or more.

5 Claims, 4 Drawing Sheets

US 7,418,178 B2

MULTI-CORE FIBER

CROSS-REFERENCE TO RELATED APPLICATIONS

This application claims priority from Japanese Patent Application No. 2006-300505 filed on Nov. 6, 2006; the entire contents of which are incorporated herein by reference.

BACKGROUND OF THE INVENTION

1. Field of the Invention

Apparatuses consistent with the present invention relates to a multi-core optical fiber preferably applied to an imaging method using an optical fiber such as a confocal fluorescent imaging method.

2. Description of the Related Art

In many medical fields such as gastroenterology, pulmonary disease, or cardiovascular disease, endoscopes are employed for direct observation of surfaces of tissues or as auxiliary apparatuses for medicine. Further, fluorescence diagnostics carried out in combination with an endoscope attracts great deal of attention.

A tissue irradiated and excited by excitation light emits a fluorescent light having a characteristic spectrum. When the tissue has a lesion such as a tumor or a cancer, the tissue emits a particular fluorescent light having a spectrum different from the normal characteristic spectrum. The fluorescence diagnostics is a diagnostic method utilizing such a characteristic to discern a tissue having a lesion from a normal tissue. As this diagnostic method does not require collection of tissues from a patient's body, patients are released from physical burden. This is one of the many advantages of this method. Japanese Patent Application Laid-open No. H08-224240 discloses a related art.

A confocal fluorescent imaging method utilizing a multi-core optical fiber is often used in combination with the fluorescence diagnostics. In this method, a plurality of excitation light beams having different wavelengths irradiate a tissue through a multi-core optical fiber and then fluorescent lights with the excitation lights from the tissue are collected through the optical fiber. Separation of the fluorescent lights from the excitation lights produces fluorescent spectra. As cores embedded in the multi-core optical fiber have two-dimensional arrangement, such information processing carried out on the cores gives a two-dimensional image. Further, such processing reciprocally carried out with changing a vertical position and filtering information only from each focal point provides a confocal image. Published Japanese translation of International Application No. 2005-532883 discloses a related art.

SUMMARY OF THE INVENTION

Certain embodiments of the present invention provide a multi-core optical fiber contributive to accurate fluorescence diagnostics.

According to an exemplary embodiment of the present invention, a multi-core optical fiber includes a cladding including quartz; and a plurality of cores embedded in the cladding, each of the cores having a diameter (D) from 1.3 μm to 2.0 μm, a numerical aperture (NA) from 0.35 to 0.45 and a refractive index profile factor α from 2.0 to 4.0, and a center of each of the cores having a germanium content from 20 wt % to 30 wt %, wherein an interval between adjacent cores is 3.0 μm or more.

DETAILED DESCRIPTION OF THE EXEMPLARY EMBODIMENTS

Figure 6:
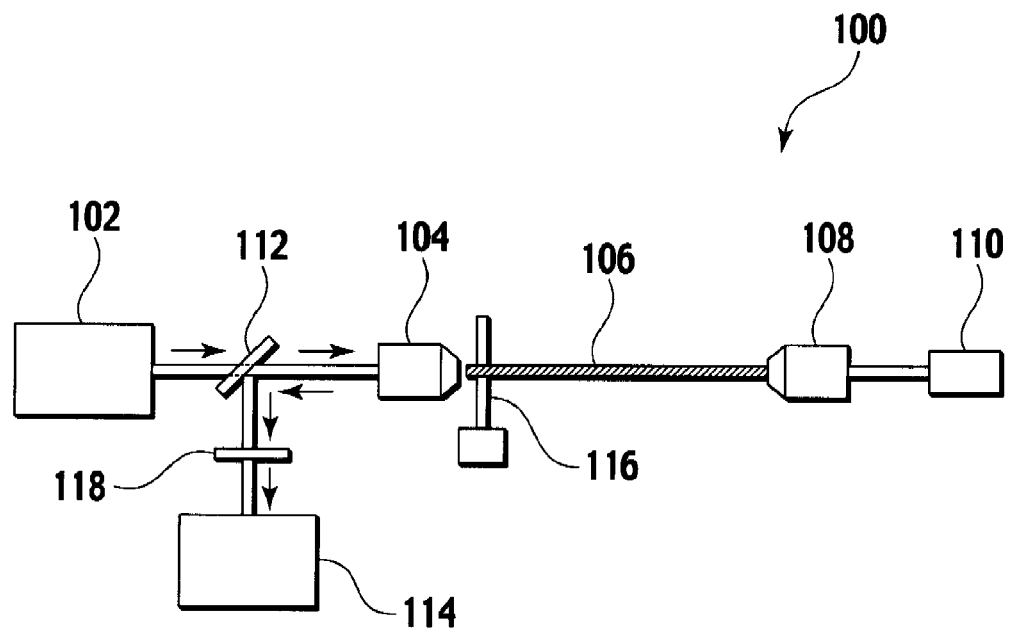
FIG. 6 is a schematic drawing of an emission spectrum measuring device.

FIG. 6 schematically illustrates a measuring device 100 pertaining to a study about a spectra of lights collected by a multi-core optical fiber.

The measuring device 100 is comprised of a light source 102 from which laser light of 488 nm in wavelength is emitted as excitation light, an optical lens 104 for condensing the laser light into a beam of from 2 to 3 μm in diameter, a multi-core optical fiber 106 so positioned as to receive the beam, an objective lens 108 provided at an output end of the multi-core optical fiber 106, and a CCD 110 optically coupled to the objective lens 108. The measuring device 100 further includes a dichroic filter 112 allowing laser light from the light source 102 to pass through and reflecting light reflected by the objective lens 108 and passing through the multi-core optical fiber 106 and the optical lens 104 in this order, and a spectrum analyzer 114 to receive the light reflected by the dichroic filter 112 (light reflected by the objective lens 108) and carry out analysis of the light. The measuring device 100 is further comprised of an XYZ stage 116 for regulating the position of the multi-core optical fiber 106 to optically couple the optical lens 104 with the multi-core optical fiber 106, and a reflective filter 118 for reducing noise.

Figure 7:
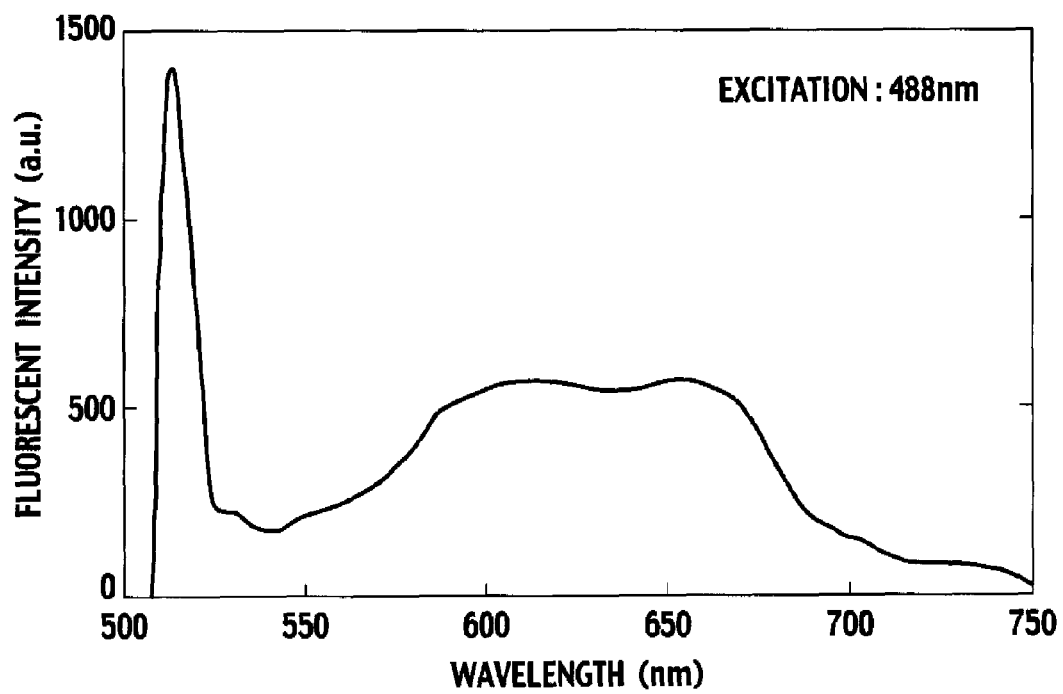
FIG. 7 is an emission spectrum in which an excitation light wavelength of 488 nm is incident on a prior multi-core optical fiber and a returned light is measured.

FIG. 7 shows a spectrum, in which an exemplary embodiment has a relatively sharp emission peak wavelength around 515 nm and a broad emission peak in the wavelength range of 515 nm to 750 nm produced by the light source 102 emitting laser light (single mode, 22 mW), collecting the light by the optical lens 104 to have the light incident into one of cores of the multi-core optical fiber 106, and carrying out analysis of the light reflected by the objective lens 108 and returned back.

Figure 8:
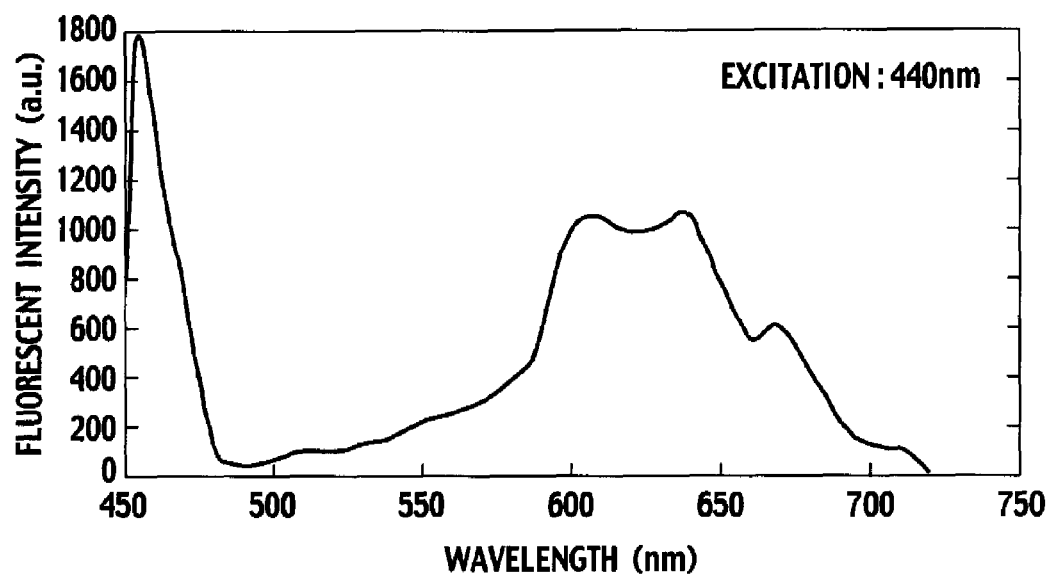
FIG. 8 is an emission spectrum in which an excitation light wavelength of 440 nm is incident on a prior multi-core optical fiber and a returned light is measured.

FIG. 8 shows a spectrum that has been observed for an exemplary embodiment in which the wavelength of the excitation light is 405 nm. This spectrum has a peak wavelength around 460 nm and a broad peak in a range from 600 nm to 640 nm. Also in an exemplary embodiment where the wavelength of the excitation light is 635 nm, a longer wavelength in a spectrum has been observed that includes a light component ranging from the excitation light wavelength to about 200 nm longer than the excitation light wavelength.

The associated light having a relatively broad spectrum deteriorates the accuracy of fluorescence diagnostics and is difficult to filter out from fluorescent light. Further, the optical fiber itself causes the associated light since it is otherwise not observed. The present invention is based on these findings.

An exemplary embodiment of the present invention will be described hereinafter with reference to the appended drawings. Meanwhile, illustrations of a multi-core optical fiber in these drawings are no more than schematic drawings and therefore the elements shown in the drawings are not necessarily drawn to scale. Shapes, dimensions, proportions and arrangement of elements in practical products may be allowed to differ from those in the illustrations. For example, any structure drawn in a circular shape may be modified into an elliptical shape and any structure drawn in a honeycomb-like arrangement may be modified into an orthogonal array.

Figure 1:
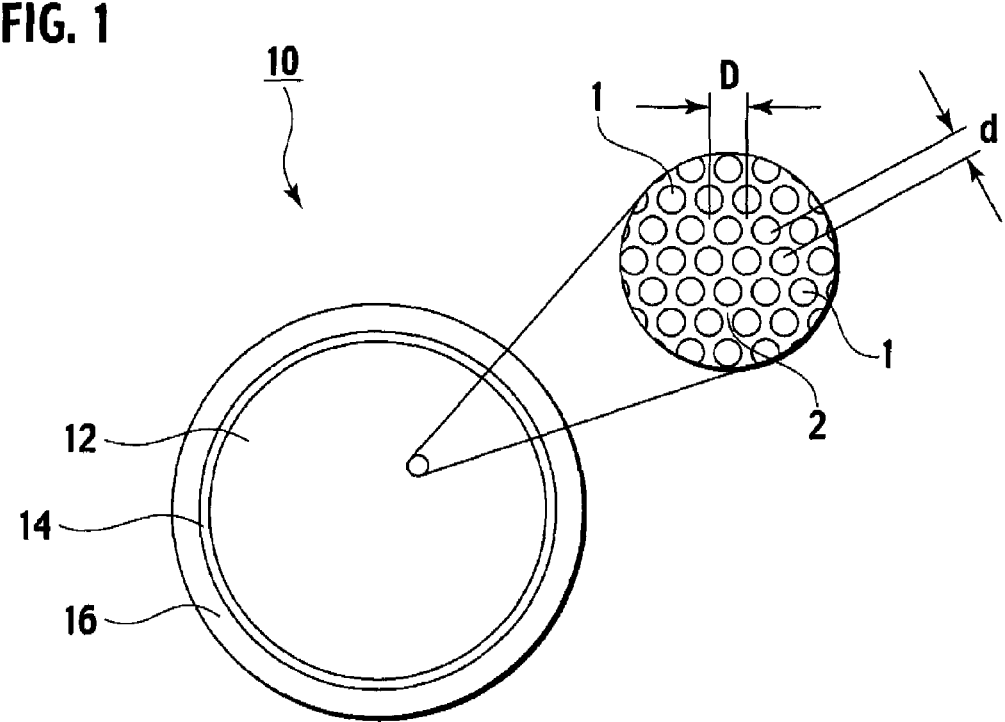
FIG. 1 is a cross sectional view of a multi-core optical fiber in accordance with an embodiment of the present invention.

Referring to a cross sectional view shown in FIG. 1, a multi-core optical fiber 10 in accordance with an embodiment of the present invention is comprised of an image circle region 12 through which an image is transmitted, a quartz-glass jacket 14 enclosing an outer periphery of the image circle region 12, and a covering layer 16 further enclosing an outer periphery of the quartz-glass jacket 14.

The image circle region 12 is further comprised of a cladding 2 that includes quartz and a plurality of cores 1 embedded in the cladding 2. Each core 1 is configured to transmit light to provide information of a pixel of an image. The cladding 2 provides a common base for these cores 1. Spaces among the cores 1 are completely filled with the cladding 2. A diameter of the image circle region 12 is for example about 500 μm and the number of cores 1 embedded therein ranges from ten thousand to thirty thousand. Thereby an image focused on one end of the multi-core optical fiber 10 is spatially divided into the number of cores 1 and the divided images are respectively transmitted through the cores 1 so that the image is reproduced on another end of the multi-core optical fiber 10.

Figure 2:
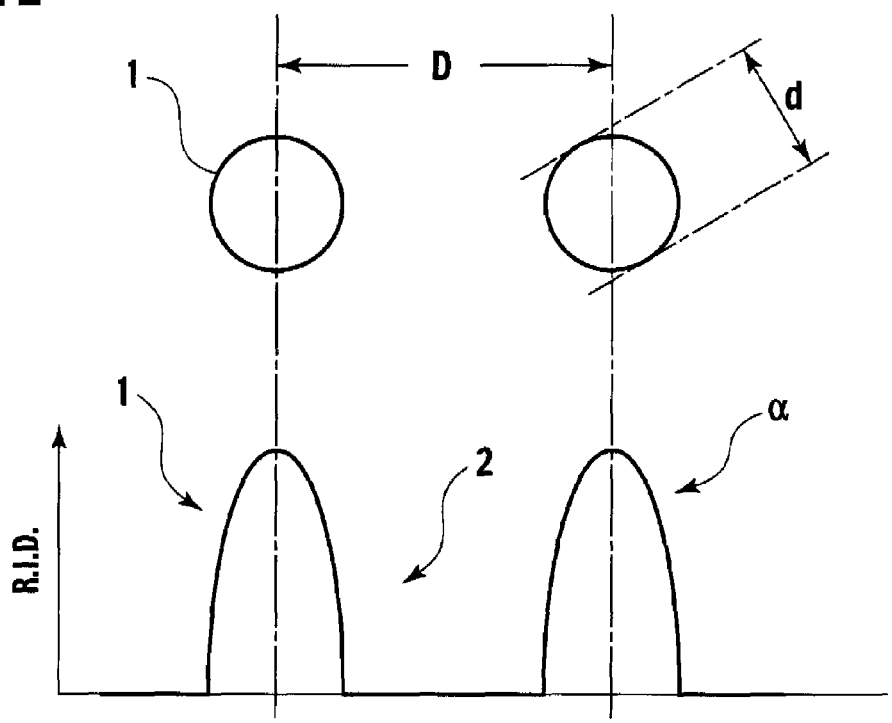
FIG. 2 is a drawing illustrating a refractive index profile around cores and a cladding surrounding the cores.

FIG. 2 is a drawing illustrating a refractive index profile around two of the cores 1 and the cladding 2. The cores 1 include quartz doped with germania (germanium oxide, $GeO_2$) which increases the refractive index. The doping agent increases in concentration toward centers of the cores 1 and therefore the refractive index profile is convex upward and has peaks at the centers of the cores 1. The profile has refractive index profile factor $\alpha$ from 2.0 to 4.0 for example. The refractive index profile factor $\alpha$ is a factor satisfying the equation of:

$$n(r)=n_1[1-2\Delta(r/a)^\alpha]^{1/2} (0 \leq r \leq a),$$

where n(r) represents a refractive index at a remove of distance r from the center of the core, $n_1$ represents refractive index at the center of the core, and a represents radius of the core.

Further, each of the cores 1 is from 1.3 μm to 2.0 μm in diameter. Interval D between adjacent cores 1 is 4.0 μm or less. Numerical aperture (NA) is from 0.35 to 0.45.

The cladding 2 includes quartz doped with fluorine which decreases the refractive index. The refractive index in the cladding 2 keeps substantially constant.

The multi-core optical fiber is produced in accordance with the following process. First, the process includes forming a quartz core preform soot by a vapor phase axial deposition (VAD) method, which is doped with germanium to have the refractive index profile factor $\alpha$ within the aforementioned range. Next, the process includes heating the preform soot in a sintering furnace so as to have the preform soot transparent-vitrified, thereby a glass rod for cores is obtained. Subsequently, the process includes forming a fluorine-doped glass layer on an outer periphery of the glass rod by a plasma outside vapor deposition method or an outside vapor deposition (OVD) method, which is to be a cladding of the multi-core optical fiber, thereby producing an optical fiber base body. The OVD method includes forming soot particles in an oxyhydrogen flame and vitrifying the soot particles by sintering. Alternatively, the glass rod may be jacketed with a fluorine-doped tube produced by a PCVD method or a MCVD method, instead of the fluorine-doped glass layer formed by the plasma outside vapor deposition method or such. Next, the process includes drawing the optical fiber base body to an optical fiber cord of several hundred μm in diameter. The process further includes cutting the optical fiber cord at intervals of predetermined length into approximately ten thousand optical fiber cords. These optical fiber cords are inserted into a quartz tube and drawn together, thereby a multi-core optical fiber of about 500 μm in diameter is produced. Finally, the process includes forming a coating layer of about 50 μm in thickness on the outermost layer. Thereby, a final product of a multi-core optical fiber is obtained.

Some experiments carried out by the inventors for the purpose of studying the origins of the associated light will be described hereinafter.

Figure 3:
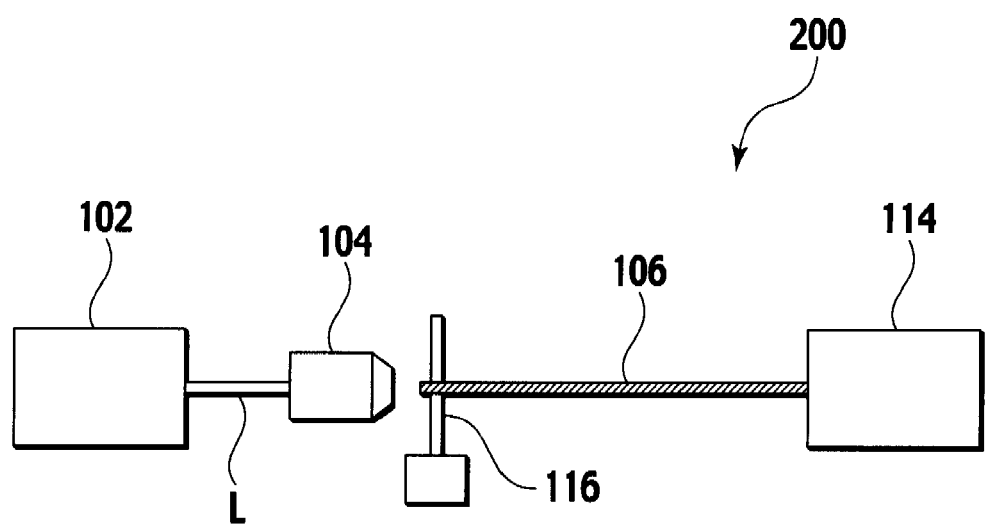
FIG. 3 is a schematic drawing showing a measuring device used for measuring properties of the multi-core optical fiber.

FIG. 3 schematically illustrates an exemplary embodiment of a measuring device used in these experiments. A measuring device 200 includes a light source 102 from which laser light of 488 nm in wavelength is emitted as excitation light, an optical lens 104 for condensing the laser light into a beam from 2 to 3 μm in diameter, a multi-core optical fiber 106 so positioned as to receive the beam, an XYZ stage 116 for regulating the position of the multi-core optical fiber 106, and a spectrum analyzer 114 (AQ-6315A produced by Anritsu Corporation) optically coupled to the output end of the fiber 106. A single mode laser device produced by Nichia Corporation (405 nm in wavelength and 10 mW in output power) is applied to the light source 102.

A plurality of multi-core optical fibers were utilized for these experiments. The multi-core optical fibers vary in Ge contents in the respective cores 1. The multi-core optical fibers respectively have Ge contents of 10 wt %, 19 wt %, 22 wt %, 26 wt %, 30 wt % and 33 wt % at the centers of the cores. Another multi-core optical fiber which is produced by using a glass rod for cores not-doped with Ge (alternatively referred to as a multi-core optical fiber having Ge content of 0 wt % hereinafter) was further provided for these experiments.

Figure 4:
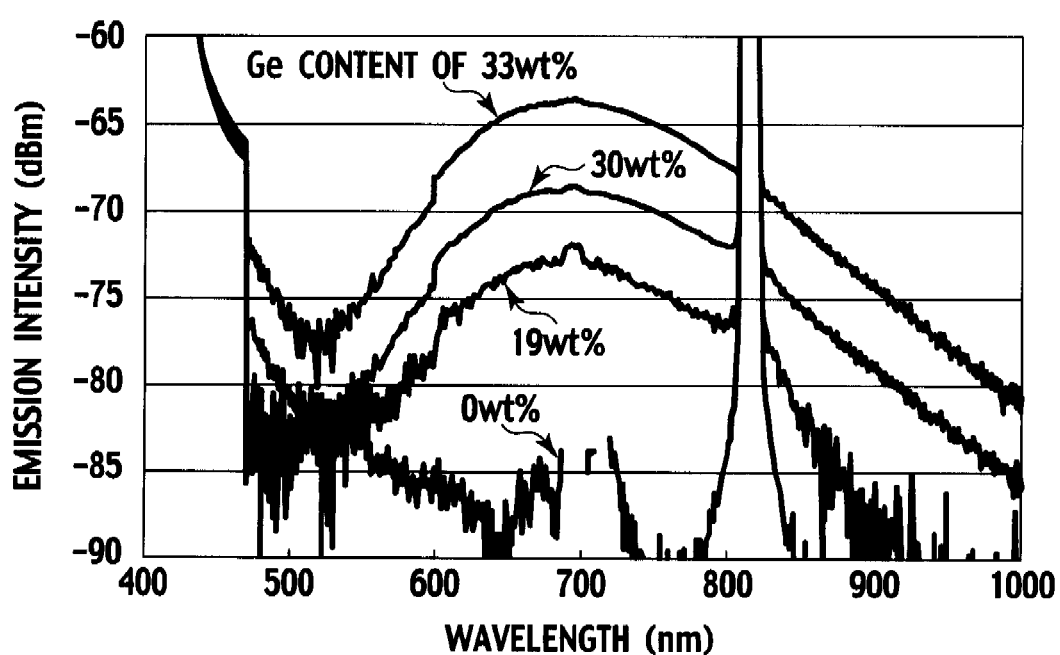
FIG. 4 is an emission spectra of multi-core optical fibers, Ge contents in respective cores of which are 0 wt %, 19 wt %, 30 wt % and 33 wt %, measured by the measuring device shown in FIG. 3.

FIG. 4 shows emission spectra measured by the measuring device 200 (FIG. 3) with respect to the multi-core optical fibers having Ge contents of 0 wt %, 19 wt %, 30 wt % and 33 wt %. As shown therein, the emission spectra have broad peaks ranging from about 500 nm to 900 nm or longer in wavelength and showing maxima at 650 nm in common. Emission intensity in these broad peaks decreases as the Ge content in the core decreases. Further, the outstanding emission substantially fades out in a case of the multi-core optical fiber having Ge content of 0 wt %. The result indicates that Ge doped in the cores relates to the emission having the broad peak.

Figure 5:
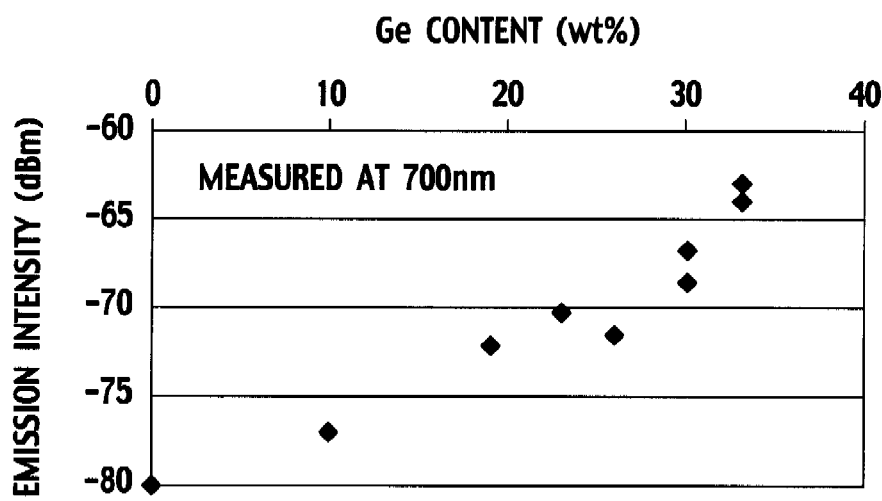
FIG. 5 is a graph showing dependence of emission intensities caused by Ge on the Ge contents in the respective cores.

FIG. 5 shows a graph with emission intensity measured at 700 nm on the vertical axis and Ge content (wt %) at the centers of the cores on the horizontal axis relating to the inventors study on how intensity of the broadband emission changes as Ge content changes. Whereas the intensity of the broadband emission is around or below the detection limit in a case of the Ge content of 0 wt % at the centers of the cores, the intensity of the broadband emission increases as the Ge content increases.

Further, the experiments give results in that the emission intensity increases as the multi-core fiber elongates, and the emission intensity decreases as the wavelength of the excitation light increases (for example, 488 nm or 635 nm). The experiments produces results in that the light corresponding to the broad peak cannot be recognized in cases of multi-core fibers of pure silica cores and F doped silica cores.

From the aforementioned results, it is understood that the emission correspondent to the broad peak is luminescence emitted by Ge in the cores excited by the excitation light. Further, the inventors studied to what extent the emission intensity gives no practical problem, and the result makes it clear that the emission intensity of −65 dBm or less gives no practical problem. More specifically, from FIG. 5, it is understood that the Ge content of 30 wt % or less in the centers of the cores gives no practical problem.

Next, resolution and contrast properties of practical importance of the multi-core optical fiber will be described hereinafter. One of parameters affecting the resolution is an interval between the cores. If the interval between the adjacent cores is shorter, the physical resolution increases, however, a too narrow interval leads to generation of cross talk. If the cross talk increases, spread of light occurs and therefore problems of a drop in contrast or that colored images may occur. While coloring may not lead to a severe problem in a multi-core fiber used in a confocal fluorescent imaging method, the multi-core fiber should be so designed as to realize a proper balance between resolution and contrast in view of a refractive index profile.

According to studies by the inventors, an exemplary embodiment of a multi-core fiber having the following constitution is for the confocal fluorescent imaging method. More specifically, it is a multi-core optical fiber (multi-core optical fiber A, hereinafter) having a cladding of quartz, and a plurality of cores embedded in the cladding, which have a core diameter from 1.3 μm to 2.0 μm; a numerical aperture from 0.35 to 0.45; a refractive index profile factor α from 2.0 to 4.0; and a center of each of the cores having a germanium content from 20 wt % to 30 wt %, wherein an interval between adjacent cores is 3.0 μm or more.

As the multi-core optical fiber A has the Ge content of 30 wt % or less at the centers of the cores, broadband emission ranging from 500 nm to 900 nm caused by Ge excited by excitation light (30 mW) of wavelength ranging from 405 nm to 635 nm may be suppressed. Therefore, fluorescence from observing sites may be obtained in a high S/N ratio at a time of observation by means of the fluorescent imaging method. On the other hand, in a case where the Ge content at the centers of the cores goes below 20 wt %, it is hard to preserve the required NA over 0.35 from the limitation of material. However, as the multi-core optical fiber A has the Ge content ranging from 20 wt % to 30 wt %, the required NA can be assured.

Further, in a case where the refractive index profile factor α is less than 2.0, as substantial NA becomes relatively small, the numerical aperture number is insufficient and fluorescence from observing sites cannot be observed with sufficient intensity. On the other hand, that the refractive index profile factor α is greater than 4.0 means that the Ge content increases substantially. Thereby emission corresponding to the broad peak caused by Ge increases and therefore it gives rise to reduction in S/N ratio. For the foregoing reason, the refractive index profile factor α is preferably from 2.0 to 4.0.

In regard to core diameter, production of a multi-core optical fiber is possible if the diameter is less than 1.3 μm. However, such small core diameter leads to broadening of an electric field of a fundamental mode (LP01) and therefore the effect of the confinement of the light in the cores is reduced. This result may lead to a state in which bending loss increases and therefore it becomes unusable. Alternatively, cross talk may increase and, as a result, resolution becomes worse. However, when the core diameter exceeds 2.0 μm, as content of Ge substantially increases, it gives rise to an increase of broadband emission ranging from 500 nm to 900 nm. For the foregoing reasons, the core diameter is preferably from 1.3 μm to 2.0 μm.

An NA of 0.35 or more is required in order to take sufficient amount of fluorescence from observing sites. If NA exceeding 0.45 is to be realized, an increase in fluorine or boron addition in the cladding is necessary. It results in an increase in the concentration of Ge in the cores. Therefore, NA is preferably 0.45 or less.

Further, in an exemplary embodiment of multi-core optical fiber A, chlorine contained in the cores is preferably 0.05 wt % or less (such fiber will be referred to as a multi-core optical fiber B hereinafter). The reason is that the emission correspondent to the broad peak tends to be higher when chlorine content is greater in accordance with the inventors' studies. To suppress the chlorine content in the cores below 0.05 wt %, it is required not to use raw material containing chlorine such as $SiCl_4$ but to use raw material of the organosilane series compounds such as tetra-methoxy silane $(Si(OCH_3)_4)$ gas, for example, at the time of production of the optical fiber base body. Further, it is required to avoid using chlorine series gases and to use other halogen series gases during dehydration and sintering.

In particular, in a case where chlorine content in the cores is 0.3 wt % or more, it gives rise to a problem in which a large number of bubbles are generated in the course of drawing the base body to produce an optical fiber. Therefore the process yield is reduced.

Furthermore, in the exemplary embodiment of multi-core optical fiber A, it will be useful when a core interval (distance between centers (center axes)) between two adjacent cores ranges from 3.0 μm to 4.0 μm and the ratio of core diameter/core interval is from 1.7 to 2.6 (such fiber will be referred to as a multi-core optical fiber C hereinafter). Thus, the observing sites are capable of being observed in resolution of a cell level (about 10 μm). If the core interval exceeds 4.0 μm, the resolution of a cell level cannot be retained. It may be inapplicable to a case where observation with this level is required. Further, in a case where the core interval is less than 3.0 μm, as the NA is from 0.35 to 0.45, bend loss and cross talk increases and it leads to a situation in which necessary information (form of spectra and intensities) cannot be obtained. If a ratio of core diameter/core interval is less than 1.7, thickness of the cladding in the multi-core optical fiber becomes insufficient, confinement of the light in the cores becomes insufficient and therefore bend loss and cross talk increase. Further, if the ratio of core diameter to core interval exceeds 2.6, an electric field of a fundamental mode (mode field diameter) is broadened, bend loss increases, and cross talk to adjacent cores increases. These result in an impossibility of increase in pixel density.

Further, in the aforementioned exemplary embodiments of multi-core optical fibers A, B and C, it is preferable that light of 635 nm in wavelength is transmitted in a single mode through the respective cores. Thereby, fluorescence having a wavelength of 635 nm or longer may be transmitted in a single mode. As cross talk increases in higher modes, by realizing a single mode, cross talk due to higher modes may be excluded. More accurate information can be extracted from fluorescence transmitted through the respective cores.

Next, examples will be shown hereinafter to explain properties of the multi-core optical fiber according to the exemplary embodiment of the present invention.

Table 1 lists structure parameters of multi-core optical fibers and evaluation results thereof. In the course of production of the multi-core optical fibers of examples numbers 8 and 22 in Table 1, fluorine had not been added in glass layers which are to be claddings of the multi-core optical fibers and therefore these multi-core optical fibers have claddings of pure silica. Further, in the multi-core optical fibers of examples numbers 9 and 23, glass rods for cores produced by a direct method are used to produce optical fiber base bodies.

Moreover, total length of the multi-core optical fibers subject to measure is 2 m. It is determined for the reason that at least 2 m is required in view of workability at a time of using a multi-core optical fiber for a fluorescent imaging method. If total length increases, the amount of Ge in the cores increases. As emission caused by Ge as described above tends to be more prominent as total length of a multi-core optical fiber increases, it is important in practice that properties as described later are obtained with this length.

Emission intensities shown in Table 1 are intensities of light measured by means of the measuring device 200 shown in FIG. 3. More specifically, the emission intensities are measured at 700 nm in wavelength by condensing laser light (10 mW) from the light source 102 using a single mode laser element (produced by Nichia Corporation) of 405 nm in wavelength into a beam of few μm in diameter, having the beam incident into multi-core optical fibers, and subsequently measuring them at the output end thereof by means of the spectrum analyzer 114. Indication of "good" means a case where the intensity is −65 dBm or less, and indication of "bad" means a case where the intensity is greater than −65 dBm. Further, in regard to fluorescence signals shown in Table 1, spectrum shapes and intensities are processed by the spectrum analyzer 114. Substantially, S/N ratios are calculated and then cases in which these value are in a level which may cause no practical problem are indicated with "good"

TABLE 1 structure parameters and evaluation results

| No. | Ge content in cores (wt %) | Chlorine content in cores (wt %) | Additive in a cladding | Refractive index profile factor α | NA | Core diameter (μm) | Core interval (μm) | core interval/ core diameter (D/d) | Cutoff wavelength (μm) | Number of pixels | Diameter of fiber (μm) | Emission intensity | Fluorescence signal | Final evaluation |
|---|---|---|---|---|---|---|---|---|---|---|---|---|---|---|
| 1 | 30 | less than 0.05 | F | 2.3 | 0.42 | 1.83 | 3.3 | 1.8 | 0.99 | 30000 | 645 | Good | Good | Good |
| 3 | 26 | less than 0.05 | F | 2.6 | 0.37 | 1.56 | 3.9 | 2.5 | 0.75 | 30000 | 763 | Good | Good | Good |
| 4 | 23 | less than 0.05 | F | 2.3 | 0.35 | 1.33 | 3.2 | 2.4 | 0.6 | 30000 | 626 | Good | Good | Good |
| 14 | 26 | less than 0.05 | F | 2.9 | 0.37 | 1.5 | 3 | 2 | 0.77 | 30000 | 626 | Good | Good | Good |
| 16 | 21 | less than 0.05 | F | 2.3 | 0.37 | 1.62 | 3.4 | 2.1 | 0.77 | 30000 | 665 | Good | Good | Good |
| 17 | 21 | less than 0.05 | F | 2.3 | 0.37 | 1.5 | 3.9 | 2.6 | 0.71 | 30000 | 763 | Good | Good | Good |
| 22 | 28 | less than 0.05 | none | 2.3 | 0.35 | 2 | 4 | 2 | 0.91 | 10000 | 452 | Good | Good | Good |
| 2 | 30 | less than 0.05 | F | 2.3 | 0.42 | 2.2 | 3.3 | 1.5 | 1.19 | 30000 | 645 | Good | Bad | Bad |
| 5 | 19 | less than 0.05 | F | 2.3 | 0.33 | 1.26 | 3.3 | 2.61 | 0.53 | 30000 | 645 | Good | Bad | Bad |
| 6 | 33 | less than 0.05 | F | 2.3 | 0.44 | 2 | 4 | 2 | 1.12 | 30000 | 782 | Bad | Good | Bad |
| 7 | 33 | less than 0.05 | F | 2.3 | 0.44 | 2.2 | 3.3 | 1.5 | 1.24 | 30000 | 645 | Bad | Bad | Bad |
| 8 | 10 | less than 0.05 | none | 2.3 | 0.21 | 1.65 | 3.3 | 2 | 0.45 | 30000 | 645 | Good | Bad | Bad |
| 9 | 0 | 0.3 | F | greater than 10 | 0.21 | 2 | 4 | 2 | 0.54 | 30000 | 782 | Good | Bad | Bad |
| 10 | 26 | less than 0.05 | F | 4 | 0.37 | 2.93 | 4.4 | 1.5 | 1.4 | 30000 | 860 | Good | Bad | Bad |
| 11 | 26 | less than 0.05 | F | 2.3 | 0.37 | 2.5 | 4 | 1.6 | 0.84 | 30000 | 782 | Good | Bad | Bad |
| 12 | 28 | less than 0.05 | F | 2.4 | 0.41 | 2.93 | 4.4 | 1.5 | 1.09 | 30000 | 860 | Good | Bad | Bad |
| 13 | 19 | less than 0.05 | F | 2.3 | 0.33 | 1.65 | 4.3 | 2.61 | 0.7 | 30000 | 841 | Good | Bad | Bad |
| 15 | 33 | less than 0.05 | F | 2.3 | 0.44 | 2.2 | 3.3 | 1.5 | 1.24 | 30000 | 645 | Bad | Bad | Bad |
| 18 | 26 | less than 0.05 | F | 2.3 | 0.4 | 3.38 | 4.4 | 1.3 | 1.74 | 30000 | 860 | Good | Bad | Bad |
| 19 | 26 | less than 0.05 | F | 2.3 | 0.37 | 3.13 | 5 | 1.6 | 1.49 | 30000 | 978 | Good | Bad | Bad |
| 20 | 10 | less than 0.05 | F | 3 | 0.29 | 2 | 4 | 2 | 0.76 | 10000 | 452 | Good | Bad | Bad |
| 21 | 28 | less than 0.05 | F | 1.9 | 0.41 | 1.89 | 3.3 | 1.75 | 0.54 | 30000 | 645 | Good | Bad | Bad |
| 23 | 28 | 0.3 | F | 3 | 0.41 | 2.57 | 4.5 | 1.75 | 0.6 | 30000 | 880 | Good | Bad | Bad | and other cases in which these values are in a level which causes practical problem are indicated with "bad". Further, in regard to the final evaluations, cases in which both the emission intensity and the fluorescence signal fall within "good" are indicated with "good" and cases in which any of them falls within "bad" are indicated with "bad".

Table 1 shows that none of the exemplary embodiments of multi-core optical fibers having any of the following structure parameters of the core diameters: the Ge contents at the centers of the cores, the numerical apertures (NA), the refractive index profile factors of the cores, and the intervals between the adjacent cores are out of the range of the structure parameter of the exemplary embodiment multi-core optical fiber A is evaluated as "good" in regard to both the emission intensity and the fluorescence signal. On the other hand, any multi-core optical fibers correspondent to the aforementioned multi-core optical fiber A are evaluated as "good" in regard to the final evaluation. From these points, advantage of the multi-core optical fiber in accordance with the present exemplary embodiment will be understood.

As described above, as the multi-core optical fiber in accordance with the present exemplary embodiment is so structured as to fall within range of the structure parameters of the core diameters, the Ge contents at the centers of the cores, the refractive index profile factors of the cores, and such, emission in the wavelength range from 500 nm to 900 nm caused by Ge in the cores is suppressed and therefore the fiber enables observation of fluorescence from tissues with high S/N ratio. Further, by limiting the numerical aperture (NA), the interval between the adjacent cores and the core interval/core diameter ratio, bend loss and cross talk are reduced and thereby resolution in a cell level is realized. Further, by realizing a single mode, cross talk is further reduced, and, by limiting the chlorine concentration in the cores, emission in the wavelength range from 500 nm to 900 nm is further reduced.

More specifically, in accordance with the present invention, a multi-core fiber which is capable of improving accuracy of fluorescence diagnostics is provided.

Although the invention has been described above by reference to certain exemplary embodiments of the invention, the invention is not limited to the exemplary embodiments described above. Modifications and variations of the embodiments described above will occur to those skilled in the art, in light of the above teachings.

What is claimed is:

1. A multi-core optical fiber comprising:
   a cladding further comprising quartz; and
   a plurality of cores embedded in the cladding, each of the cores having a diameter (D) from 1.3 μm to 2.0 μm, a numerical aperture (NA) from 0.35 to 0.45, a refractive index profile factor ($\alpha$) from 2.0 to 4.0, and a center of each of the cores having a germanium content from 20 wt % to 30 wt %,
   wherein an interval (d) between adjacent cores is 3.0 μm or more.

2. The multi-core optical fiber of claim 1, wherein each of the cores has a chlorine content of 0.05 wt % or less.

3. The multi-core optical fiber of claim 1, wherein the cladding includes fluorine.

4. The multi-core optical fiber of claim 1, wherein a ratio of the interval (d) to the diameter (D) is from 1.7 to 2.6.

5. The multi-core optical fiber of claim 1, wherein the cores transmit light at a wavelength of 635 nm in a single mode.

* * * * *